June 18, 1940.  E. W. DAVIS  2,204,576
METHOD OF REDUCING ORES
Filed July 12, 1937  9 Sheets-Sheet 1

Inventor
EDWARD W. DAVIS
By Paul, Paul & Moore
ATTORNEYS

June 18, 1940.    E. W. DAVIS    2,204,576
METHOD OF REDUCING ORES
Filed July 12, 1937    9 Sheets-Sheet 2
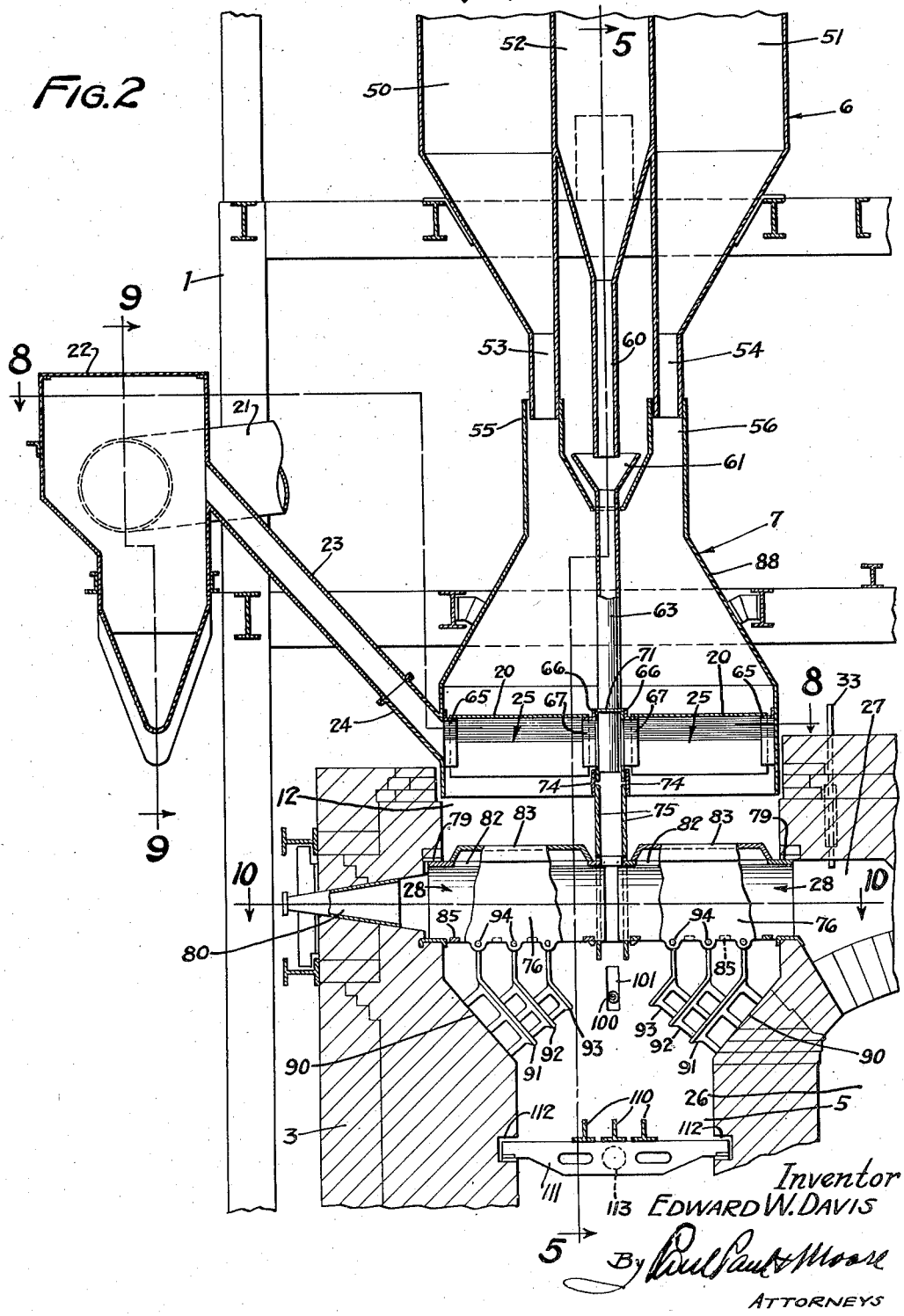

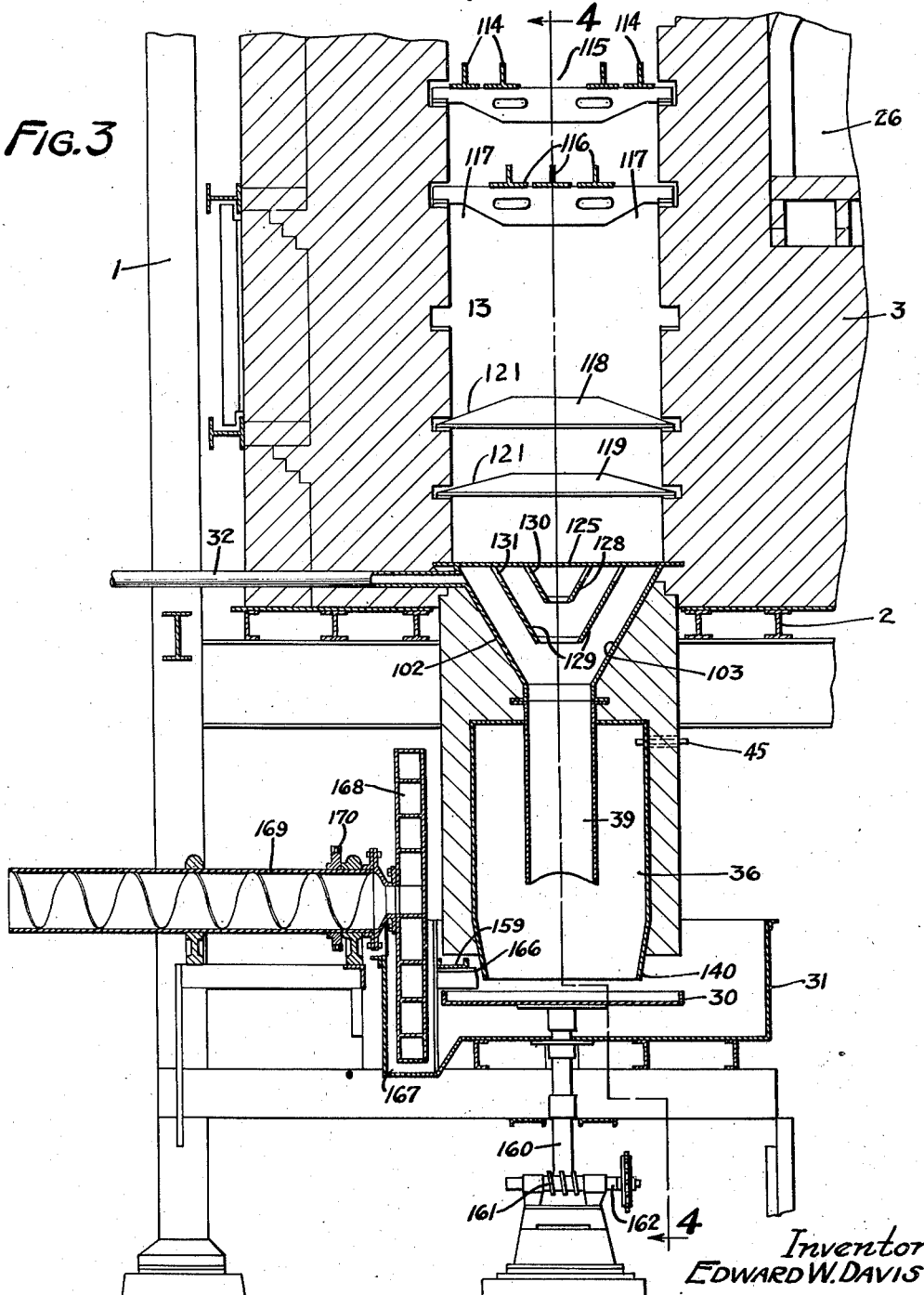

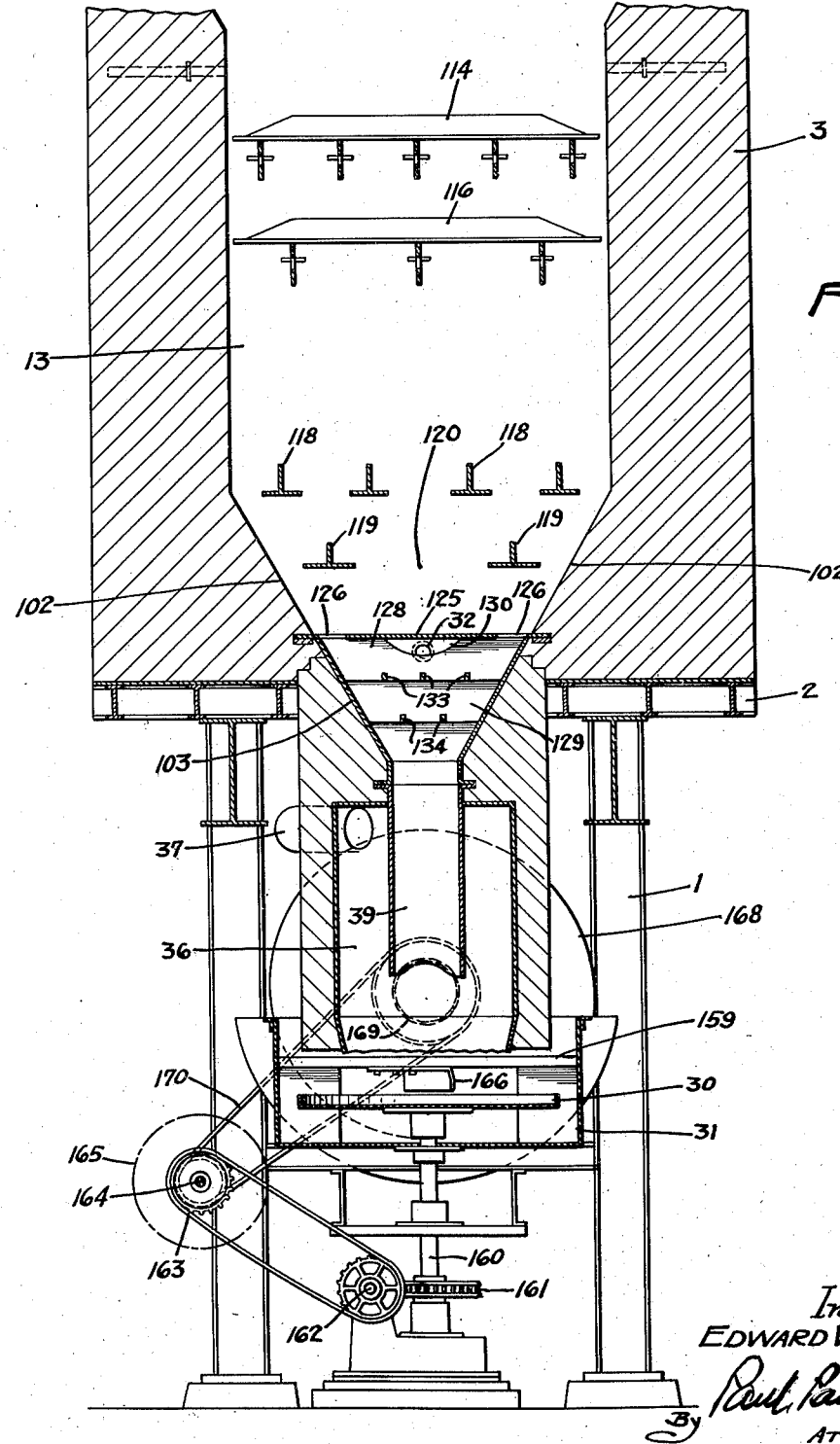

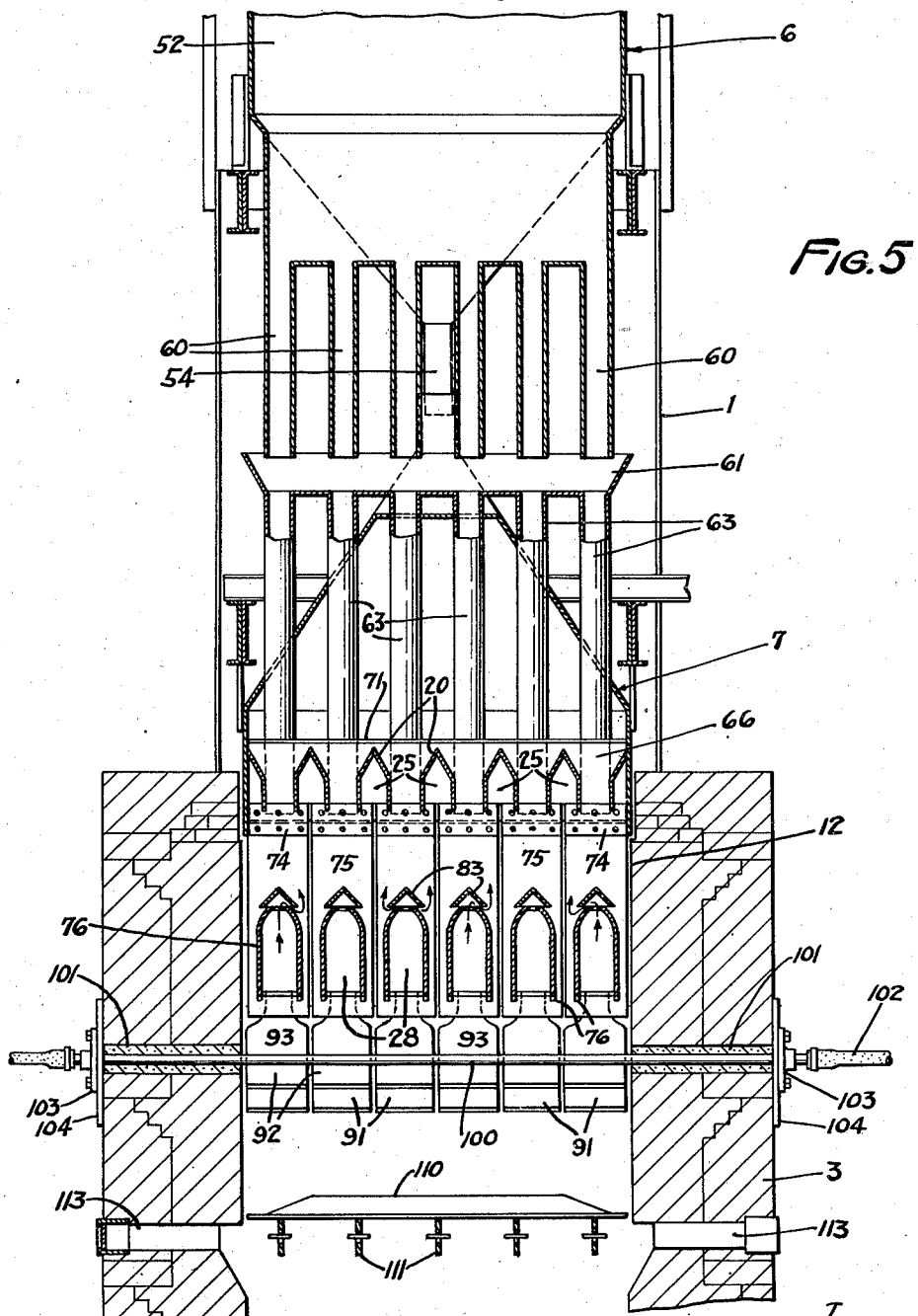

June 18, 1940.  E. W. DAVIS  2,204,576
METHOD OF REDUCING ORES
Filed July 12, 1937  9 Sheets-Sheet 6
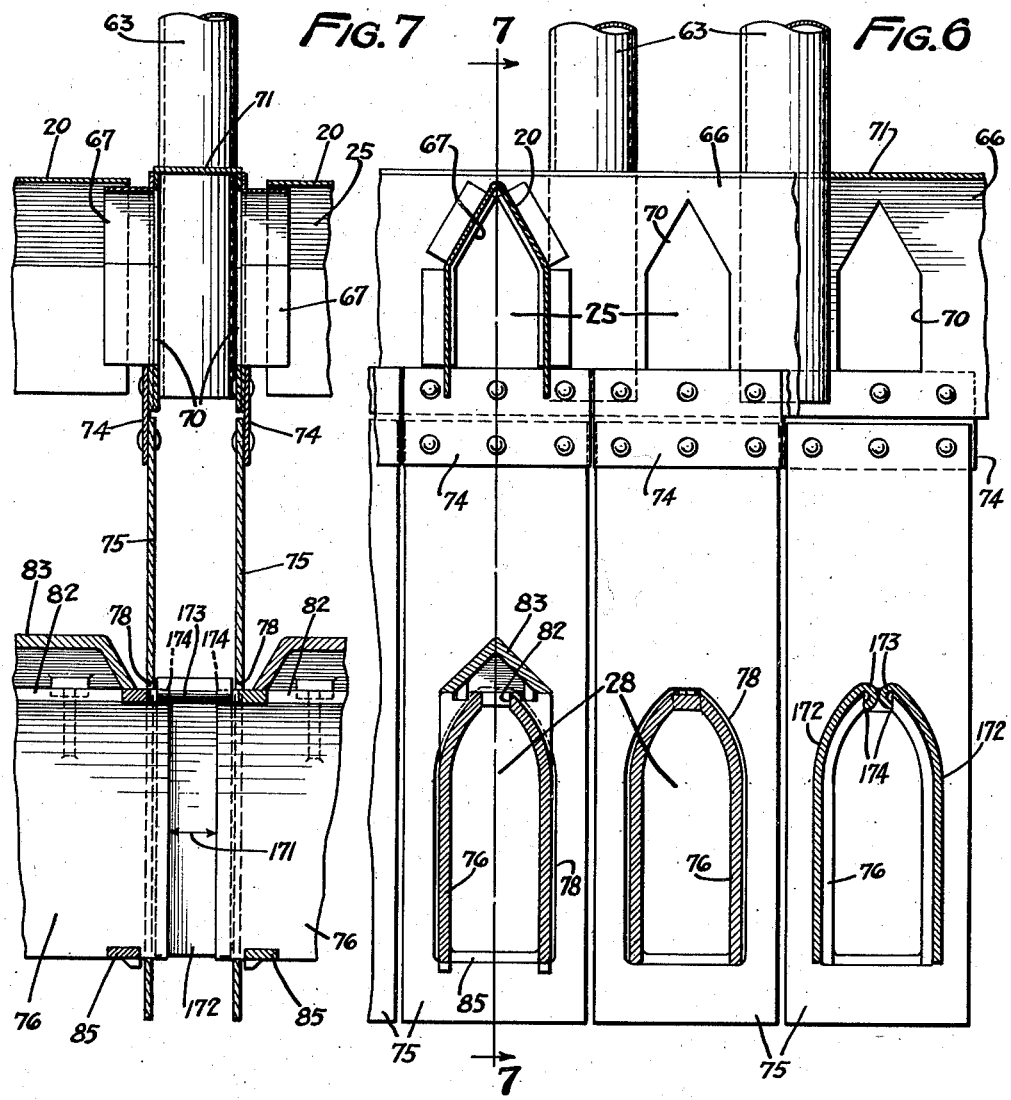
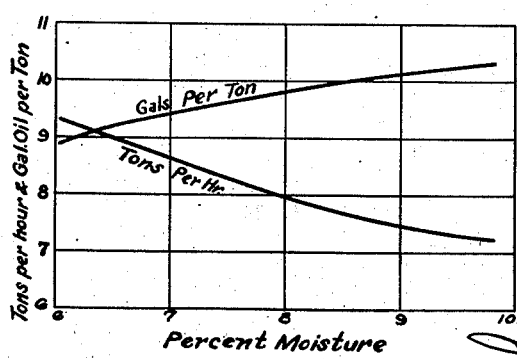
Fig.15
Inventor
EDWARD W. DAVIS
By Paul Paul & Moore
ATTORNEYS June 18, 1940.  E. W. DAVIS  2,204,576
METHOD OF REDUCING ORES
Filed July 12, 1937  9 Sheets-Sheet 7
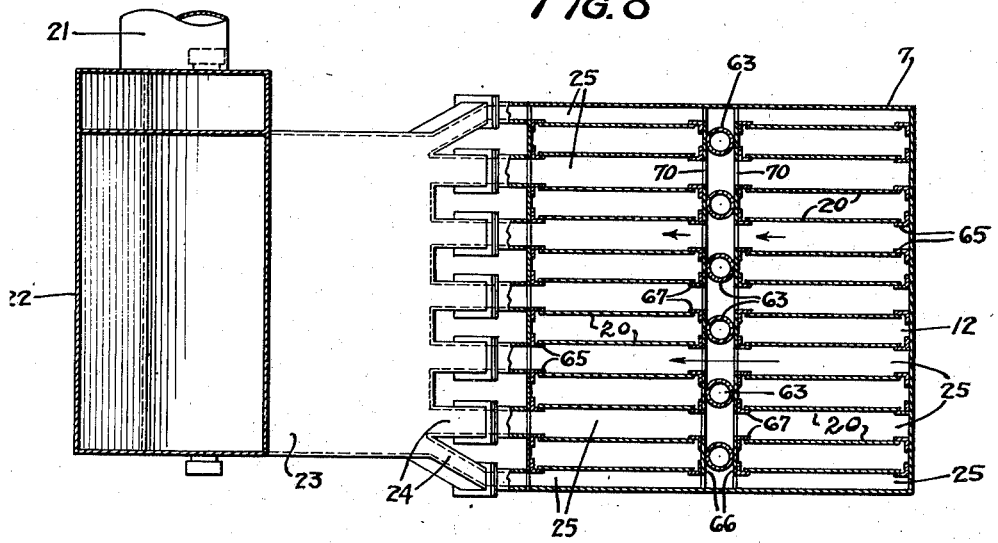
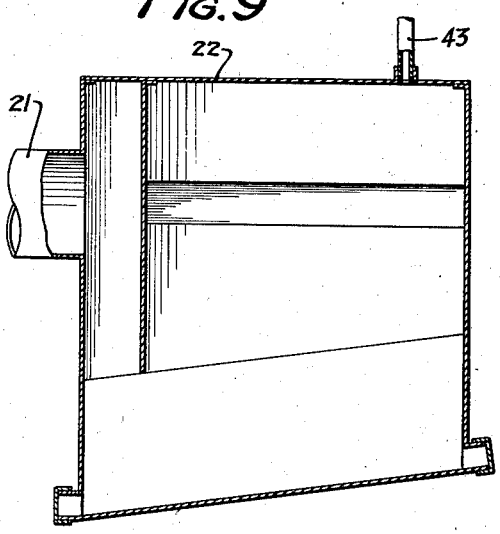
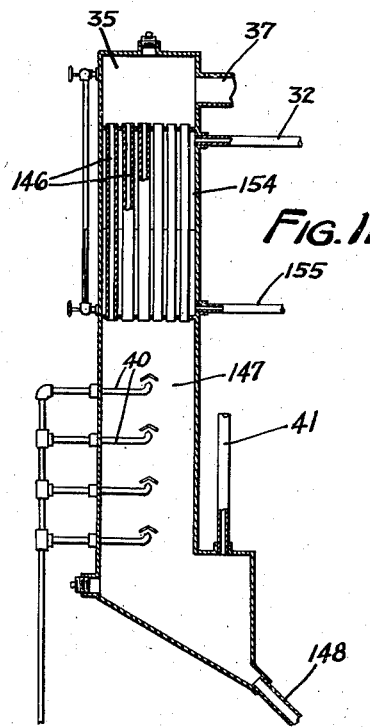
Inventor
EDWARD W. DAVIS
By Paul, Paul & Moore
ATTORNEYS Inventor
EDWARD W. DAVIS

ATTORNEYS

June 18, 1940.  E. W. DAVIS  2,204,576
METHOD OF REDUCING ORES
Filed July 12, 1937  9 Sheets-Sheet 9
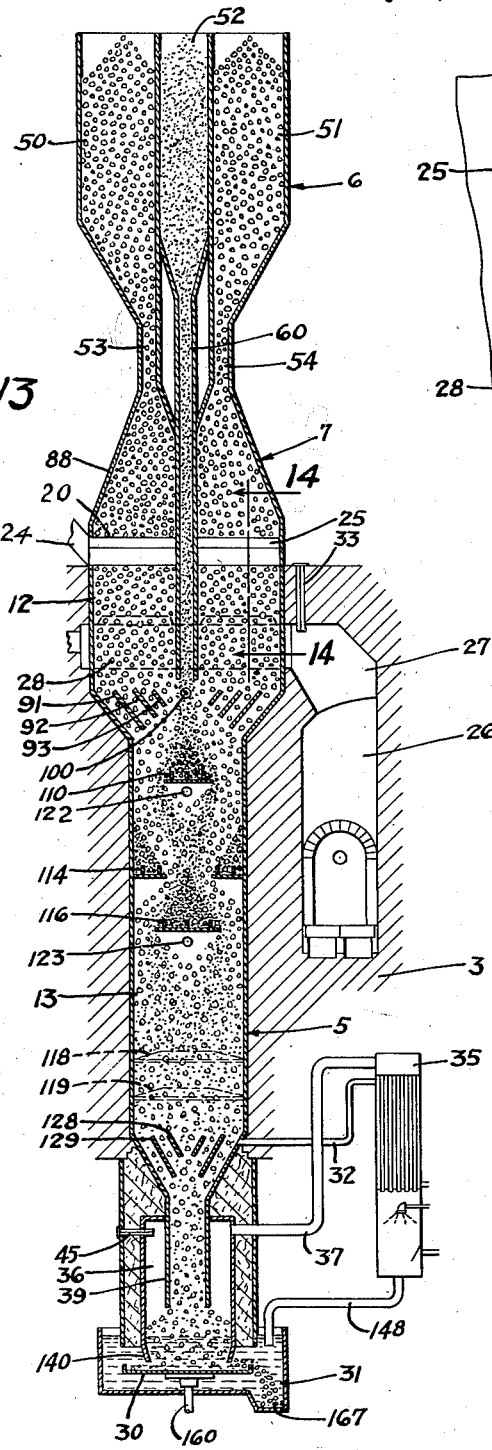
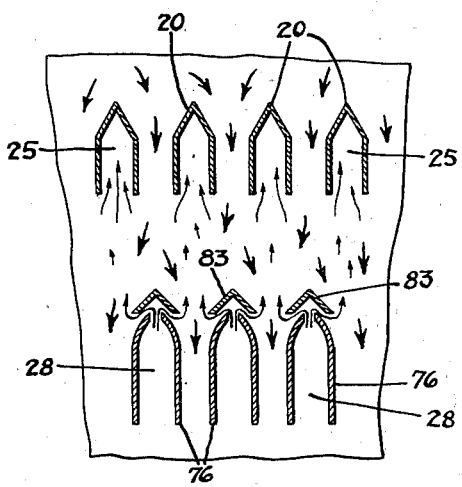
Inventor
EDWARD W. DAVIS
By Paul, Paul & Moore
ATTORNEYS Patented June 18, 1940

2,204,576

UNITED STATES PATENT OFFICE 2,204,576

METHOD OF REDUCING ORES

Edward W. Davis, Minneapolis, Minn.

Application July 12, 1937, Serial No. 153,176

11 Claims. (Cl. 209—8)

This invention relates to a method for converting hematite ($Fe_2O_3$) into magnetite ($Fe_3O_4$) so that the iron can be extracted by magnetic separators for concentration of the iron ore, i. e., for the removal of the waste material known as gangue.

It is an object of the present invention to provide an improved method of treating hematite type iron ore to convert it into magnetite type iron ore which is capable of concentration by magnetic separators for the removal of waste material known as gangue.

It is a further object of the invention to provide a commercially practical method, which is capable of producing a relatively high efficiency of conversion from non-magnetic hematite type ores to magnetic magnetite type ores, and which is capable of producing such relatively high percentage conversion even though the hematite ore contains as much as one part of fines to three parts of coarse particles.

It is a further object of the invention to provide an improved process for converting hematite type ore into magnetite type ore by a continuous process in which such ores are progressed through a heating zone, a comingling and reducing zone, and a reoxidizing and cooling zone which are arranged in descending order, one under the other.

It is a further object of the invention to provide an improved process in which coarse hematite is heated to an elevated temperature and thereafter tumbled downwardly with relatively cool fine hematite ore while simultaneously being subjected to a countercurrent of reducing agent.

It is also an object of the invention to provide an improved process of reacting upon hematite ore to convert it to magnetite, in which process the ore is moved continuously downwardly in a column and subjected during its downward movement to successive countercurrents of heating gases, reducing agents, and to a cooling and reoxidizing agent, all to produce a magnetically separable treated ore in which a high percentage of conversion from the non-magnetizable to the magnetizable state is accomplished.

Other and further objects of the invention are those inherent in and suggested by the method herein illustrated, described and claimed.

The method of the present invention is preferably carried out in an apparatus of the type herein illustrated and described.

Figure 2 is a vertical section illustrating the hopper details and the construction at the upper part of the furnace;

Figure 3 is a view complemental to Figure 2, illustrating the lower portion of the furnace;

Figure 4 is a section illustrating the lower part of the furnace, and taken approximately on line 4—4 of Figure 3;

Figure 5 is a sectional view of the upper part of the furnace taken approximately on line 5—5 of Figure 2;

Figure 6 is a detail vertical section further illustrating the hanger construction for the exhaust and hot ports;

Figure 7 is a vertical section on line 7—7 of Figure 6;

Figure 8 is a plan section taken approximately on line 8—8 of Figure 2;

Figure 9 is a vertical section of the suction box taken approximately on line 9—9 of Figure 2;

Figure 11 is a vertical section through the oil vaporizer, and water condensing apparatus;

Figure 13 is a diagrammatic vertical section illustrating the operation and process;

Figure 14 is a diagrammatic section on line 14—14 of Figure 13 illustrating the up-flow of the gases and down-flow of the material;

Figure 15 is a diagram showing the effect of moisture in the ore, on furnace capacity and oil consumption.

General Scheme

Figure 1:
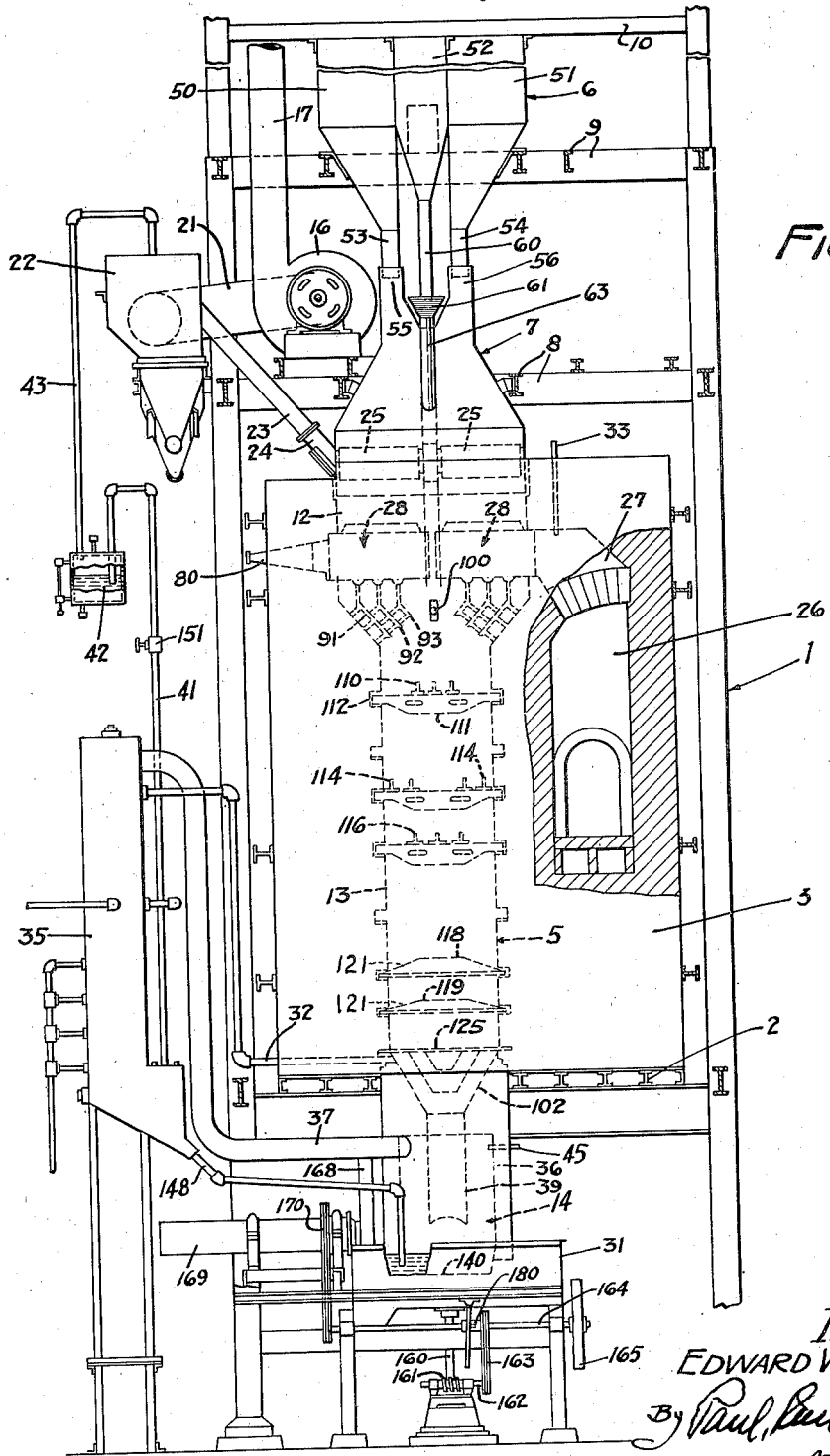
Figure 1 is an elevation partly in section illustrating the general construction of the furnace.

Referring first to Figure 1, the device has an iron frame generally indicated at 1, which includes cross beams generally indicated at 2 which support a masonry structure generally indicated at 3, said masonry structure providing a vertical shaft or chamber shown in dotted lines and generally indicated at 5. The ore is prepared for reduction and is reduced, as it moves continuously downwardly. Mounted above the structure 3 are hopper structures comprising upper and lower sections respectively generally indicated by numerals 6, 7. The lower section 7 is supported by cross beams 8 and the upper section 6 is supported by cross beams 9 and 10. The lower terminals of section 6 and the upper terminals of section 7 are telescopically related to allow for expansion and contraction, and the lower terminal of section 7 is telescopically related to shaft or chamber 5 of the masonry structure for the same purpose. By this means the masonry structure can expand and contract independently of the hopper section and each hopper section can expand and contract independently of the other. The hopper section 7 extends into the shaft 5 and has structures later to be described, which are hung from or in part supported thereby.

The furnace proper as constituted by the masonry structure 3 consists of two main zones, chambers or divisions; a heating chamber generally indicated at 12, and a reducing chamber generally indicated at 13, said chambers being continuous in the formation of the shaft generally indicated at 5. Below the reducing chamber a cooling chamber generally indicated at 14, and which is later described in detail.

The travel of the gases is upwardly and is controlled by suction. The gases travel upwardly as the charge moves downwardly. This travel is controlled by an exhaust fan indicated at 16, which delivers into pipe 17, and which has its suction side connected by a suitable pipe 21, with a suction box or dust catcher indicated at 22. This box 22 is connected by a manifold 23, and a series of pipes 24, see Figure 8, with a series of tubular exhaust ports indicated at 25. The structure of these ports is later described, and is a feature of the apparatus for carrying out the process of the present invention. These exhaust ports are open at the bottom and extend completely across the heating chamber or zone 12.

Into the heating chamber are introduced hot gases which are the products of combustion from a combustion chamber generally indicated at 26. These products of combustion are sucked through passages 27 into hot ports generally indicated at 28, thence from the tops of said ports upwardly through the charge in the chamber 12 to exhaust ports 25. These hot drying gases pass to the suction box or exhaust chamber 22.

The minimum temperature of the gas, leaving the exhaust ports 25, is determined by the amount of water in the ore and in the products of combustion that the gases must carry away as vapor. The combustion chamber 26 is preferably designed for the combustion of fuel oil, but natural or artificial gas may be used. A thermocouple 33 is used to ascertain the temperature in passages 27. The mixing of fine ore with the coarse is an important feature, as are the means for obtaining and maintaining the proper mix ratio between the coarse and fine ores, and for obtaining heat transfer from the coarse to the fine ore. These matters are treated in detail herebelow.

The rate of travel of the ore through the furnace is controlled by feeder means, in this instance a rotary feeder plate 30, arranged in the cooling zone and beneath water in a quenching tank 31, see Figures 3 and 4. This plate operates in a manner to be described in detail.

The gas for reducing the ore is introduced at the bottom of the furnace through pipe 32, see Figure 1. The gas is formed by vaporizing fuel oil in a vaporizer heated by steam generated in the quenching tank and the gases pass upwardly through the ore. The vaporizer is generally indicated at 35. The steam which is generated by quenching the reduced ore rises into the chamber 36 and passes through pipe 37, to the top of the vaporizer 35. A thermo-couple 45 is used for indicating the temperature in the steam chamber. Water of condensation is returned to the quenching tank 31 in which the feeder plate 30 operates. The ore is discharged from the furnace and onto the plate through a tubular member 39.

In the apparatus 35, see Figure 11, are water sprays 40 which condense the steam after it has vaporized the oil, leaving in addition the noncondensible gases which consist of air which was in solution in the water and of hydrogen formed by chemical reaction in the quenching chamber. The quantities of these gases are small and they are drawn off through a pipe 41 through an explosion trap 42, the opposite side of the trap being connected by a suction pipe 43, with the suction box 22, the suction fan 16 serving to exhaust the gas through the trap. At the beginning of operation water is put into the explosion trap but with continuous use water of condensation increases the quantity of water and at intervals this water is drained out, the level being ascertained by a suitable water gauge.

Having given a general description of the scheme, I will now proceed to describe various structures in detail. All details of construction, along with the relative arrangements of the various structures, are features of the apparatus for carrying out the steps of the method.

*Hopper structure*

Referring to Figures 1, 2, 5: For some operations the ore to be roasted is crushed to three-fourths inch size and then screened at four mesh, the oversized coarse ore being delivered into the two laterally placed hoppers 50, 51, and the undersize or fine ore being delivered into a middle hopper indicated at 52. The three hoppers or bins together have a capacity of about ten tons of ore, in proportion of about eight tons of coarse to two tons of fine.

The lower narrowed ends of the hoppers 53, 54 of the hoppers 50, 51 enter corresponding narrowed upward extensions 55, 56 of the lower hopper section 7. The coarse ore is finally delivered into the reducing chamber 13, and is handled within that chamber in a manner to be described. The fine ore hopper or bin 52 delivers by means of a series of narrow spouts 60, see Figure 5, into a receiving trough 61, which trough in turn delivers into a corresponding number of tubes 63. The lower ends of these tubes extend into the heating chamber 12, and deliver between plates which define a passage which leads the fine ore to a point near the bottom of the chamber where it is mixed with the coarse ore. By this means the finer ore is delivered into the middle of the coarse ore which has passed downwardly into the chamber 12 to the bottom portion thereof.

*Exhaust ports*

Referring now to Figures 2, 5 and 8 and to the structure of what are herein called the exhaust ports. These ports as previously mentioned deliver to pipes 24 which in turn deliver to manifold 23. These ports are constituted by inverted U or V-shaped casings 20. These casings are supported on rests 65 carried by the hopper 7. Arranged at opposite sides of the tubes 63 near their bottom ends are plates 66 providing rests 67 for the casings 20, and the casings 20 are supported in aligned pairs on the rests 65 and 67. The plates 66 have openings 70 therein, wherethrough the gases travel from one section 20 to the other between the pipes 63 as shown in Figures 7 and 8. The gases can also pass upwardly between the plates and through said openings 70. The tops of the plates 66 are capped by a plate 71 to prevent upward escape of gases. Thus upwardly traveling drying and other gases are baffled into the pipes 24 and manifold 23, by means of the suction created by fan 16 in the suction box or dust collector 22. It is noted that the plates 66 are supported at the ends by the walls of the lower hopper 7.

Plates 66 support other plates, see Figures 2, 5 and 7 which constitute a continuation of the fine ore passage, and into which the bottoms of the pipes 63 deliver, and by which passage of the fine material is delivered into the heating zone centrally of the mass of coarser ore. These plates are indicated by the numeral 75 and they are connected to the plates 66 by plates 74.

Hot ports

Figure 10:
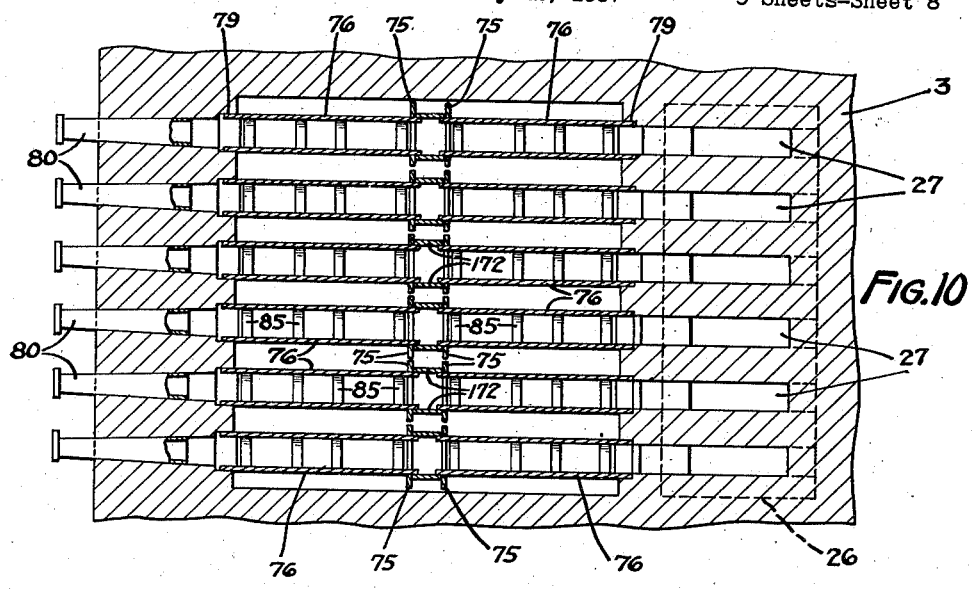
Figure 10 is a horizontal section through the hot ports taken approximately on line 10—10 of Figure 2.
Figure 12:
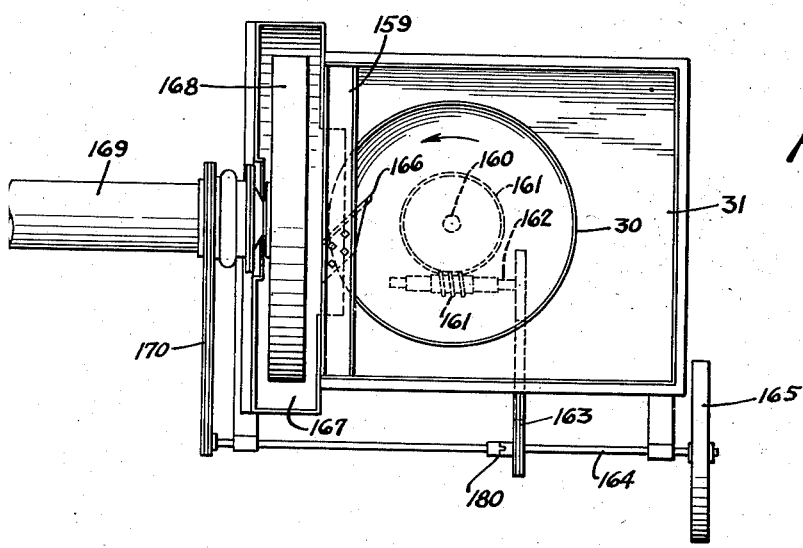
Figure 12 is a plan of the quenching tank feeder plate and conveyor assembly.

These hanger plates 75 have openings 78 for receiving the inner ends of the pairs of hot port casings which receive hot gasses from the combustion chamber 26. These hot ports 28 are composed by a series of inverted U or V-shaped casings 76, the inner ends of which enter the openings 78 of the plates 75 and the outer ends of which are inserted (see Figure 2) in openings 79 of the masonry. Referring to Figure 10, it will be seen that inspection passages 80 communicate with the interior of casings 76, openings 79 and passages 27 of the furnace. The furnace operator is thus provided with an easy means of inspecting the interiors of the furnace parts.

The casings 76 are open at the top as at 82 and are provided with covers or cowls 83 so spaced that gas rising into the casings 76 escapes as shown by the arrows in Figures 5 and 14. The sides of the casings 76 are reenforced at the bottom by cross elements 85. The hot ports and all of the baffles are made of an alloy of iron, nickel and chromium, the exact proportion of the elements depending upon the service required. It is necessary to provide adequate means for expansion to prevent warping and buckling. To this end the inner ends of the casings 76 are spaced apart as in Figure 7 to allow for expansion, the outer ends of each element only being fixed in the masonry, see Figure 2. Expansion also has been provided for the exhaust ports 25, by allowing space between the ends thereof and the elements 65 and 67, by which they are supported.

From the coarse bins, the ore passing through the constrictions 53, 54, 55, and 56 is delivered into the enlarged lower portion of the lower hopper 7. The purpose of this enlargement is to spread the ore horizontally. The angle of the sides 88 of this hood to the horizontal is about 60° which is greater than the angle of repose of the ore, and the ore is thus pressed against the surface of this hood at all times so that no rolling of the individual particles occurs. The ore next enters the heating chamber, the structures within which have been previously described.

The inner ends of the hot port casings 76 are spaced at 171 to allow for expansion. In order to make the hot port casings continuous across space, a detachable cowl is formed by plate members 172 having hook-like upper extremities 173 the outer ends of which engage the inner faces 174 of the casings 76. The horizontal dimension of these members 172 is less than the space between the plates 75, to allow for expansion.

Baffles

Suspended from the hot ports 76 are two opposed series of superposed baffled elements. The outermost member of each series rests on an inclined surface 90 which surfaces lead inwardly and downwardly to the reducing chamber or zone 5. These baffles are respectively indicated 91, 92, 93, and they are respectively connected to the elements as at 94.

Referring now to Figure 5, as well as to Figure 2, means is provided near the entry point of the finer ore, into the heating chamber, to regulate the amount, and speed of entry. This means in this instance comprises a hollow rod 100, adjustable in vertical slots 101 of the masonry structure 3. This rod is connected with a cooling source by means of hose sections 102. This rod is mounted in plates 103 which are adjustably secured to plates 104. The slots may be packed after adjustment of the pipe 100 has been made.

The temperature to which the coarse ore must be heated so that the resulting mixture of the coarse and fine ore will have the required temperature must be carefully controlled, and the proportion of the mixture must be carefully controlled. And this is accomplished in part by the element 100. When the ratio of the coarse to the fine ore is to be about five to one, it is necessary to heat the coarse ore to a temperature of about 1270° F., if the desired temperature of the mixture is to be about 1100° F. If the ratio of coarse to fine is about four to one, the coarse ore must be heated to about 1310° F. If the ratio is three to one a temperature of about 1370° F. is necessary. The limitation as to temperature is due to the fact that the hot port casings are made of high temperature alloy steel which for long life should not be operated continuously at a temperature above 1800° F. Further discussion regarding these factors appears below.

Reducing chamber

Referring now to Figures 1 to 4 inclusive. An important feature of this invention is to so control the material that it moves downwardly uniformly and without channeling, and so that thorough mixing of the two grades of ore occurs. As has been heretofore shown the coarse ore enters the heating chamber and in its descent therethrough passes between the exhaust ports and then the hot ports. At a point below the hot ports the finer ore is added. The resistance in the system is such that for the quantity of hot gases required, a suction at the fan 16 of about 10 inches of water is necessary. The contraction in the areas 53, 54 of the bottoms of the coarse ore bins, above referred to, is necessary to prevent excessive leakage of air downward through the ore bins through the hood into the exhaust port. With the construction very little leakage takes place. After passing the hot ports 28 the material passes into the reducing chamber 5 where it meets with the reducing gases. Uniform heating of the coarse ore is essential for satisfactory operation, and this is accomplished by having a uniform flow of gas upwardly through the entire cross section of the heating zone and by having a uniform movement of the ore downward through the hot gases. To obtain mixing of the fine ore with the coarse the baffles are arranged not only to mix the coarse and fine but to also regulate the amount of fine ore that flows into the reduction chamber from the fine ore bins. The baffle 100 controls the rate of flow for mixing and the various baffles below this are adapted to mix the coarse and fine ores and at the same time give access of the reducing gases to all of the ore particles.

Referring to Figures 1, 2 and 5, just below the baffles 91, 92, 93, and in the more restricted reducing chamber, is a centrally arranged baffle composed of three T-irons 110 arranged in slightly spaced relation shown, and resting upon suitable sheet metal supports 111 which have their ends set into recess 112 as shown. Room for expansion is provided to prevent buckling. Suitable inspection openings 113, see Figure 5, are arranged just below this baffle 110. Below the baffles 110 (see Figures 3 and 4) are arranged two baffles. The irons 114 of the upper of these two baffles are arranged in pairs, one pair near each opposite wall of the chamber, thus providing a central space 115. The irons 116 of the lower of these two baffles are centrally arranged to provide lateral spaces 117, as are provided by the arrangement of the irons 110. Below the irons 116, are two more baffles. The upper composed by four irons 118 about equally transversely spaced, and the lower composed by two irons 119 spaced to provide a central opening 120. It is noted that the irons 110, 114, and 116 are parallel while the irons 118, 119 are at right angles to the other irons. The vertical flanges of the irons are slantingly cut as at 121. The action of these baffles is diagrammatically indicated in Figure 13.

At the bottom of the reducing chamber or zone 5 another reduction in horizontal area is made. For this purpose the sides are slanted as at 102, to receive a casing 103 having correspondingly slanted sides which lead into the pipe 39 which pipe extends into the steam chamber 36. This reduction is made so that the ore can be discharged through a small central opening.

Referring now to Figures 3 and 4 the casing 103 has mounted therein a pair of baffles. Topping the casing is a plate 125 having openings 126 at opposite sides near the walls of the casing. The reducing gas enters through the pipe 32 and is delivered beneath the plate 125 to pass upwardly through the material which is flowing downwardly through said openings 126. Depending from the plate 125 are two pairs of slanting baffles, the members of which are respectively designated 128 and 129. These baffles are slanted to conform to the slant of the sides of the casing 103. The upper parts of these plates or baffles 128, 129 have openings respectively designated 130 and 131 and the bottoms of the plates are connected by cross bars or baffles respectively designated 133 and 134.

Steam chamber

After descending through the reducing chamber the ore enters the pipe 39 which delivers to the steam chamber 36. This reduction in cross section of pipe 39 is desirable to prevent flow of reducing gases into the cooling chamber and to control the flow of steam from the steam chamber into the reducing chamber. The lower end of the steam chamber dips into the water of the quenching tank 31, the water being maintained at a constant level by a float valve not shown.

As shown in Figure 13 the water forms a seal for the steam chamber 36. The lower end 140 of the casing of the steam chamber, see Figure 3, is disposed adjacent the rotary control plate 30, and the water in the tank 31 not only seals the bottom of the steam chamber 36 but also provides means for cooling the ore. The rotary feeder plate 30 is below the level of the water and as it rotates the hot ore slowly moves downwardly into the water producing steam which escapes into the chamber 36, thence, see Figures 1, 11 and 13, through the pipe 37 to the oil vaporizer and condenser. Since the steam is formed below the surface of the water it must pass upwardly through the ore to escape into the chamber 36. Referring to Figure 11, the steam is delivered to the top of the vaporizer 35, and passes downwardly through pipes 146, whereafter it meets with water sprays issuing from the pipes 40 and is condensed in the chamber 147, and delivered therefrom through pipe 148 to the quenching tank 31.

The water sprays condense all of the steam leaving only the non-condensible gases which consists of air which was in solution in the water and the hydrogen formed by chemical reactions in the cooling chamber. The quantities of these gases are small and they are pumped, see Figure 1, from the condenser through pipe 41 which has a valve 151, and the upper end of which pipe enters an explosion trap 42. The upper end of the trap is connected by pipe 43 with the dust collector 22, and the suction is provided by a fan 16, through pipe 21.

The pipes 146 pass through a chamber 154, see Figure 11, and into this chamber the fuel oil to be vaporized is delivered by pipe 155. The oil surrounds pipes 146 and is vaporized, and is delivered from the chamber 154 into the pipe 32.

Rotary feed control

Referring now to Figures 1, 3, 4, 12 and 13, and first to Figures 1 and 3. The rotary feeder plate 30 is operated by shaft 160 through a worm drive 161 and shaft 162. Shaft 162 is driven by chain and sprocket gear 163 from shaft 164. Shaft 164 is pulley driven, the pulley being indicated at 165. The ore column is supported by the plate in the manner shown in Figure 13 and is understood that the rate of feed is entirely controlled by this plate.

The reduced and quenched ore is scraped from the plate by a scraper indicated at 166 mounted on a cross beam 159 supported by the sides of the tank 31. This ore falls into the tank and into a sump 167. The material is preferably moved from the sump and tank by means of a conveyor like that shown in my Patent No. 1,449,216 which includes a spiral scoop 168 which delivers into a horizontal conveyor tube 169 suitably rotatably mounted. The tube is rotated, see Figures 4 and 12, by means of a sprocket chain drive 170 from shaft 164. By means of a clutch 180, the feeder plate drive can be disconnected from the main drive shaft 164. The pulley 165 is operated by means not shown but by which the speed of rotation of the plate is properly controlled.

Operation

The following description of the operation also discloses the mechanical, qualitative and quantitative steps in the process, which process is claimed herein along with the apparatus.

Referring to Figure 13: The ore to be roasted is crushed to about three-fourths inches and then screened at four mesh. The coarser, or oversize material goes into the coarse ore bins 50, 51 and the finer or undersize goes into the fine ore bins 52. The three bins together have a capacity of about ten tons in proportion of eight tons of coarse to two tons of fine. The fine ore by-passes the heating zone and does not enter the furnace proper until it reaches or almost reaches the reducing zone. It is introduced into the coarse ore below the hot ports 28. In one installation the ore passes through the coarse ore bin at the rate of about eight and one-half tons per hour, and through the fine ore bin at the rate of one and one-half tons per hour. The coarse ore only is preheated. The bins are not allowed to become empty.

The thermo-couples 33 are placed at the entrance of the hot ports 28 and the entry temperature of gases into these ports is not allowed to rise above 1800° F. The thermo-couple 45 in the cooling chamber indicates the temperature of the steam being produced, which is approximately that of the temperature of the ore being discharged from the reducing chamber. For some operations this temperature should be maintained at about 1050° F. This temperature is maintained by controlling the speed of the rotary feeder at the bottom of the furnace. If the temperature drops below 1050° F. the feeder is slowed down slightly. If the temperature rises above 1050° F. the feeder speed is slightly increased. The operator should maintain the temperature at the entrance to the hot ports 28 at about 1800° F., and should so operate the feeder as to maintain steam temperature in the steam chamber 36 at 1050° F. A pyrometer records the important temperatures throughout the furnace, and the number of revolutions per unit of time of the feeder indicates the tonnage of ore which the operator has been able to roast. Occasional readings of oil and steam pressures at various points in the furnace enable one to more closely analyse operating conditions. The chief operating difficulties are due to changes in moisture content of the ore. As long as the moisture content is fairly constant, the furnace operates with a minimum of attention.

The temperature of the gases from the combustion chamber 26, entering the hot ports 28 is dependent upon the amount of oil being burned, and upon the amount of air being drawn through the combustion chamber by the fan. Since the ore burners always consume an amount of oil dependent upon valve setting, and since the fan is operated at constant speed, the only reason for change in the temperature of the combustion gas is a change in resistance to the flow of the gases through the heating zone. A change in this resistance is due to change in the size of the coarse ore. The crude ore is ordinarily screened normally at one-fourth inch in a vibrating screen or sometimes if the ore is exceptionally wet it is necessary to use a three-eighths inch screen. When wet ore is encountered, more fine material passes through the heating zone with the coarse ore, thus increasing resistance to flow of gases and decreasing the amount of oil that may be burned in the combustion chamber, and this occurs at a time when additional heat is necessary for evaporation of the additional water. Thus the amount of oil burned per hour is actually less when the ore is wet than when dry. These facts are indicated by the curves in Figure 15, which show the changes in capacity and fuel consumption as the moisture changes in the ore. When the ore is wetter, due for example to rain, the first noticeable effect is the increase in temperature of the hot gases from the combustion chamber. This makes necessary an immediate reduction in the amount of oil being burned, in order to reduce the temperature to normal. The next effect is a decrease in temperature of the steam indicating that the ore in the reduction chamber is cooler. To counteract this it is necessary that the feed rate be reduced until the temperature again reaches normal. If this is not done the quality of the roast decreases rapidly.

Figure 16:
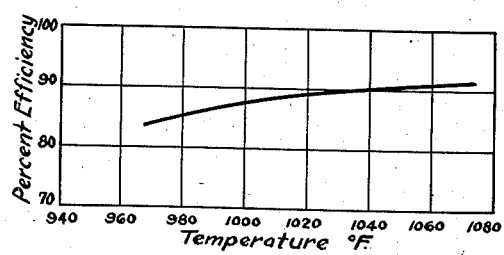
Figure 16 is a diagram showing the relation between steam temperature and roasting efficiency.

The effect on the quality of the roast, of a change in temperature of the ore, is indicated by the temperature of the steam, and is shown by the curves in Figures 16. These curves indicate that for a roasting efficiency of 90%, the temperature of the steam in this particular example should be about 1040° F.

Roasting efficiency is defined as the percentage of iron oxide which is present as magnetite divided by the total percentage of iron in the furnace product. As the steam temperature decreases, the efficiency falls off quite rapidly, and as it increases, the efficiency increases slowly. From the above it is evident that the various adjustments in operation must be made because of changes in the moisture content of the ore. The adjustments are preferably automatically controlled by thermostatic devices (not shown) to regulate feeder speed, to maintain a constant steam temperature.

When the ore can be dried before screening and before feeding no substantial operating adjustments are necessary, and the fuel consumption per ton is materially reduced and the capacity of the furnace materially increased.

In its downward course the ore spreads against the sides 88 of the hood-like lower portion of the hopper. The coarse ore is split as it passes the exhaust ports 25, and is again split as it passes the hot ports 28. The long axes of these ports 25 and 28 are parallel. The charge then engages the slanting baffles 91, 92, 93, which extend at right angles to the long axes of the hot ports 28. At this point the finer ore is added to the coarse and thereafter the mixture is acted upon successively by baffles 110, 114, 116, 118, 119, 128 and 129, in a manner to obtain thorough mixing and even down flow substantially without channeling.

The baffles, the arrangement of which is a feature of the invention, cause each particle of ore, at any given level of the chambers to move downwardly at approximately the same speed as other particles at the same level. The contraction in cross section at the bottoms of the coarse ore bins are for substantially preventing leakage down through the coarse ore bin into the exhaust ports. By reducing this area the resistance to air passage is greatly increased and most of the air drawn from the furnace by the fan must enter the combustion chamber, pass into the hot ports, and then into the exhaust or cold ports. It is therefore necessary to make the hot port casings, as well as most of the baffles, of special grades of alloy steel so that they will withstand the temperatures required. The reducing zone and combustion zone are built of fire brick heavily insulated to prevent heat loss and the cooling chamber is also insulated to prevent loss of heat from the steam.

In the operation of the furnace, about three gallons of oil per ton of ore fed for reduction is used. This oil is pumped into the vaporizer. Six gallons of oil per ton of ore is fed for combustion in chamber 26 where it is burned in an ordinary oil burner (not shown).

The down-moving ore in the heating chamber or heating zone is traversed by hot gases which are the products of combustion of oil burners, and which are being drawn upwardly through the hot ports 28. The resistance in this system is such that for the quantity of hot gases required, a suction at the fan of about ten inches of water is necessary.

After passing the hot ports, the ore passes downwardly into the reducing chamber where it meets the reducing gases. It will be noted that the fine ore may be said to have been shunted around the heating zone, and it is only added to the coarse ore near the point of entry of the ore into the reducing zone. If the fine ore is not separated from the coarse before being passed through the heating zone, the power of the fan has to be materially increased, and the dust losses are excessive. I therefore believe it new in this art to handle the coarse and fine grade ore in this manner, which handling has other advantages to be described.

In one type of furnace as now constructed, these drying gases pass through a column of ore about 24 inches high, and give up most of their heat to the ore. These gases enter the lower part of the heating zone, and the hot gas ports at a temperature of about 1832° F., and have a temperature of about 212° F. as they leave the exhaust ports 25.

Because the fine ore is not heated directly, it is necessary to heat the coarse ore to a higher temperature than would otherwise be necessary, so that it may give up part of its heat to the fine ore and yet still be sufficiently hot for rapid reduction.

The temperature to which the coarse ore must be heated so that the resulting mixture of coarse and fine will have the required temperature, may be computed when the proportion of coarse to fine ore is known.

In the present furnace the desired temperature of mixture is about 1100° F., and since the ratio of coarse ore to fine is about five to one, it is necessary to heat the coarse ore to a temperature of about 1270° F. If the ratio is four to one it will be necessary to heat the coarse ore to about 1310° F. If the ratio is three to one, a temperature of about 1370° F. is necessary. At present it sems that the best operation cannot be obtained with a ratio of coarse ore to fine ore of much less than three to one, because of difficulty of heating the coarse ore to the high temperature required. This limitation of temperature is not due to the melting or softening of coarse ore since this would hardly occur below 2000° F., but is desirable because the hot port casings are constructed of high temperature alloy steel, which for long life should not be operated continuously at a temperature above 1800° F.

This scheme of operation for increasing the life of this part of the furnace is a feature of the invention. This limits the temperature of the products of combustion entering the hot ports, and since the rate of the heat of transfer between the gas and ore is proportional to the difference in temperature, the rate of heat transfer decreases rapidly as the temperature of ore approaches the temperature of the products of combustion. Were it necessary to heat the coarse ore to a higher temperature, the time of contact between hot gases and ore would have to be increased which requires either a slower feeding rate and therefore reduced capacity, or a longer path of travel of gases through the ore, which means material increase in the power required by the fan.

It is to be further noted that the minimum temperature of the gases leaving the exhaust ports is determined by the amount of water in the ore and in the products of combustion that the gases must carry away as vapor. Since it is not possible to definitely determine the maximum amount of water that the ore may carry, because of rain, snow, etc., the exhaust ports are in the present furnace placed about 18 inches above the hot ports to maintain a minimum temperature of the exhaust gases of about 200° F. At this temperature the carrying power of gas for water vapor is so large that even abnormal quantities of moisture are handled without difficulty.

The finer ore which bypasses the heating zone passes over and around the hot ports and receives some heat from them by direct contact, but since gases cannot pass upwardly to any substantial extent through the fine ore, the amount of heat which it absorbs is little more than sufficient to vaporize the moisture which it contains.

The combustion chamber which supplies the hot gases to the hot ports is designed for the combustion of oil. It may also be used by either natural or artificial gas. Some change in design is necessary if stokers or pulverized coal burners are used. The oil burners are so operated that no flame enters the hot port casings. This is an important consideration because flame in the hot port casings may cause overheating and rapid deterioration of the alloy steel. To prevent overheating the thermo-couples 33 are placed in the entrance of the hot ports, and the oil burners are so operated that these couples register a temperature of approximately 1800° F. at all times. It is obvious that automatic temperature controls could be installed to control the fuel to maintain this temperature.

Uniform heating of the coarse ore is essential for satisfactory operation and this can be accomplished only by having a uniform flow of gas upwardly through the entire cross section of the heating zone, and a uniform movement of the ore downwardly through the hot gases.

The means for securing these uniformities of movement of the ore are features of the invention. Whether or not the movement of the ore at any of these points is uniform depends upon the movement of the ore below the heating zone. It was found desirable for structural as well as metallurgical reasons to reduce the cross sectional area of the furnace below the heating zone, to increase the velocity of the flow of the reduced gases upwardly through the ore and to simplify the problem of uniformly mixing the fine ore with the coarse. Since the reduction in area caused a non-uniformity of the ore movement, it was a problem to obtain the optimum combined effect of increase in velocity of the reducing agent upwardly and uniform mixing of the coarse and fine ore. The uniform mixture of ore at this point is desirable to produce an ore column through which reducing gases may pass without channeling. The method of baffling to secure this uniform motion, is shown and is claimed per se.

The fuel pipe 32 delivers, see Figure 3, beneath the plate 125 and the fuel gas passes upwardly through openings 126, see Figure 4. It is noted that the fine ore is delivered substantially as a sheet extending from one side of the furnace to the other in a direction transverse to the ports 25 and 28. By means of baffle 100 the rate of flow of fine ore is controlled, this is accomplished by raising and lowering the baffle. The various baffles in the reducing chamber, see Figure 13, are designed to mix the coarse and fine ore, and at the same time give the reducing gases access to all of the ore particles. The open spaces below these baffles equalize the gas pressure and produce desired directions of flow, because the gases tend to flow from one open space to the next above. Beneath the baffle 110 and, if need be beneath the baffle 116, are placed draw-off pipes 122, 123, for removing any unburned gases which may be traveling upwardly. This for the purpose of preventing such gases reaching the top of the reducing chamber, that is, reaching the point at which the fine ore is introduced into the coarse whereby to prevent interference with temperature regulation at this point for the purposes previously mentioned. These gases which are removed may be used as fuel in the system and this is preferably accomplished by suction apparatus not shown which removes the gases and delivers them to the furnace 26.

The baffles are arranged not only to mix the coarse and fine ore but also to regulate the amount of fine ore which flows into the reduction chamber from the fine ore bin. The various baffles in the reducing chamber are designed to mix the coarse and fine ores, and at the same time give the reducing gases access to all of the ore particles.

Near the bottom of the reducing chamber, oil vapor is forced into the furnace and passes upwardly through the preheated ore causing a reduction and a change from hematite to magnetite. The reducing gas is formed, as before stated, by vaporized fuel oil in a vaporizer heated by steam from the steam chamber. In this instance the vaporizer, see Figure 11, is somewhat similar to a fire tube boiler, and the high temperature steam passes downwardly through two inch pipes which are surrounded by the oil to be vaporized. The temperature of the steam is about 1000° F. and the boiling point of the oil used is about 600° F. In the vaporizer the oil is not only vaporized but the vapor is superheated to a temperature of about 900° F. The oil is pumped into the vaporizer at a rate that produces the required flow of reducing gas, and the oil assumes the level in the vaporizer depending upon the amount and temperature of the steam being produced in the steam chamber. The reducing agent itself can be improved by converting the hydrocarbons into hydrogen and carbon monoxide. No attempt is made to crack the oil in the vaporizer, but upon its entry into the reducing chamber in contact with the iron oxide, reactions occur that produce principally methane, carbon, carbon monoxide, and hydrogen, the two latter being the active reducing agents. The carbon is discharged from the furnace with ore and is lost and the methane passes upwardly through the reducing chamber and burns in and around the hot ports. This tends to cause local overheating, and to overcome the difficulty it is necessary at times to withdraw part of the unconsumed gases at the top of the reduction chamber. The gases are burned in the combustion chamber 26.

After descending through the reducing zone 5, the ore enters the cooling chamber through pipe 39, and then enters a water bath. As before stated the feed of the ore is controlled by a revolving plate 30 upon which the charge rests. As this plate revolves the hot ore moves slowly downwardly into the water. The water level is several inches above the bottom of the hopper so that the ore does not fall into the water but passes into it gradually, as the ore is withdrawn by the action of the discharge plate. Contact between ore and water produces a considerable quantity of steam. This steam escapes through the steam pipe 37, to the vaporizer, leaving the furnace at a temperature of about 1112° F., which is about the temperature of the ore of the cooling chamber. Therefore, a considerable quantity of cooling of the ore is accomplished at the same time by superheating the steam. This is a valuable feature of the invention.

The thermo-couple in the steam outlet from the cooling chamber directly indicates the temperature of the ore being discharged and this is one of the major operating controls. The reduced ore should be cooled below a temperature of 212° F. before it contacts the air, to prevent reoxidation of the hematite.

To prevent reducing gases from forcing downwardly into the steam chamber, it is necessary to keep the steam pressure equal to or greater than the pressure of the gases in the reducing chamber. The presence of a limited amount of steam in the reducing chamber is desirable since it tends to prevent over-roasting and since it also reacts with the oil vapor to some extent to produce hydrogen and carbon monoxide. Oil vapor as is well known is a very concentrated reducing gas and therefore the quantity required is small and the pressure in the reducing chamber seldom exceeds one-eighth of an inch of water. A good operating condition is obtained by a pressure of about one-fourth inch of water. The balancing of pressure so that steam will not flow up to any great extent and so that reducing gas will not flow out with the steam is a valuable feature. It is not necessary to maintain the pressures exactly equal as a little upward seepage of steam is not objectionable.

From the oil vaporizer the oil enters the condenser where it meets several water sprays which condense it. The pressure in the steam chamber 36 is maintained constant by maintaining the pressure in the condenser constant at about one and one-half inches of water less than that in the steam chamber. Only non-condensible gases are left which consist of air in solution in water and such hydrogen as has been formed by chemical reactions in the cooling chamber. The quantity of these non-condensible gases is small. They are drawn from the condenser by fan 16 which communicates with the condenser by pipe 43, trap 42, pipe 41 and valve 51. By controlling the suction of the fan 16 by means of valve 151, pressure of steam in the cooling chamber may be adjusted. The non-condensible gases may form an explosive mixture and they therefore pass through the exposive trap 42. These gases may be used as fuel in the combustion chamber 26.

It is conceivable that the steam may be used for other purposes thus conserving heat, since the steam contains about two-thirds of heat absorbed by the ore in the heating zone. In one type of furnace constructed in accordance with the present invention approximately two hundred pounds of steam at a temperature of 1000° F. is produced per ton of ore fed to the furnace. It is at a pressure of about one-fourth of an inch of water and contains considerable dust, part of which is as coarse as twenty mesh. This dust is all in the form of magnetite and is returned to the quenching tank with the water from the condenser. When the steam is used for other purposes, the dust is removed.

A feature of this invention is to so control the temperature of operation as to obtain a maximum of product with a minimum of deterioration of the various alloy steel casings, and baffles of the furnace. The casings and baffles are so arranged as to allow for ample expansion, and this arrangement combined with the novel control permits of at least 20,000 hours of continuous operation.

Under normal conditions the operation of the furnace is quite simple. Thermo-couples placed at the entrances to the hot port casings indicate the temperature of the gases from the combustion chamber, this temperature being maintained at about 1800° F. at all times by means of controls not shown for the oil burners not shown in the combustion chamber.

A thermo-couple in the cooling chamber indicates the temperature of the steam being produced. In one operation, this temperature is found to be about 1050° F., to produce properly roasted ore. The temperature is maintained by controlling the speed of the rotation of the feeder 30. If the temperature drops below 1050° F. the feeder is slowed slightly. If the temperature increases above 1050° F. the speed of the feeder is slightly increased. The chief duty of the operator is to maintain the temperature at the entrance of the ports at about 1800° F. and to operate the feeder at the proper rate of speed to maintain a steam temperature of about 1050° F.

Fuel consumption per ton increases as the ore is wetter. This change, however, has practically no effect on the metallurgical results secured in the magnetic concentration plant. The grade of concentrate, the percent of weight recovery, and the percent of iron recovery remain practically constant. For example: When the ore is exceptionally dry, containing only about 6.2% of moisture, the temperature of steam may be 1087° F. indicating that the feed rate would be increased above nine tons per hour.

The temperature of the gases from the combustion chamber entering the hot ports is dependent only on the amount of oil being burned and on the amount of air drawn through the combustion chamber by the fan 16. Since the oil burners consume an amount of oil dependent upon valve setting and since the fan is operated at constant speed, the only reason for a change in temperature of the combustion gases is a change in the resistance to the flow of said gases through the heating zone and a change in this resistance is caused only by the change in the screen analysis of the coarse ore.

As before stated, the crude ore is screened normally at one-fourth inch. This is accomplished on the vibrating screen, and when the ore is exceptionally wet it is necessary to use a three-eighths inch screen. Even with the use of this coarser screen, the oversize contains considerably more fine ore than when drier material is screened at one-fourth inch. For this reason when wet ore is encountered, necessarily more fine material passes through the heating zone with the coarse ore, thus increasing the resistance to the flow of gases and decreasing the amount of oil that may be burned in the combustion chamber, and this occurs at a time when additional heat is necessary for the evaporation of the additional water. Drying the ore eliminates this difficulty and makes the output of the furnace more uniform.

I claim as my invention:

1. A process for converting hematite into magnetite which comprises moving a column of graded ore downwardly through a shaft, and controlling the down feed by discharge means upon which the bottom of the column rests, and passing the ore successively through, a preheating zone, a mixing and reducing zone, and a cooling zone, and then discharging the reduced ore, the process being characterized by first preheating a relatively coarsely graded ore in the preheating zone, thereafter introducing thereinto a relatively finely graded ore, then moving the graded ores together through the mixing and reducing zone while mixing the ores and while passing reducing agent therethrough to cause reduction, by causing the hot reduced ore to be discharged while submerged in water in the cooling zone whereby steam is generated which tends to pass upwardly through the submerged charge of the down traveling column of reduced ore, and by maintaining the steam pressure at about the entry pressure of the vaporized reducing agent into the reducing zone in a manner substantially to prevent downward escape of the reducing agent into the cooling zone, and to prevent upward escape of steam through the downwardly moving reduced ore into the reducing zone.

2. A process for converting hematite into magnetite which consists, in moving an unbroken column of graded ore downwardly through a shaft and controlling the downfeed by means upon which the bottom of the column rests, and passing the ore successively through, a preheating zone, a mixing and reducing zone, and a cooling zone, and then discharging the magnetite or reduced ore, the process being characterized by first preheating a relatively coarsely graded ore in the preheating zone, then introducing thereinto an unpreheated relatively finely graded ore, then moving the graded ores together, through the reducing zone while mixing and while passing reducing agent upwardly therethrough, by causing the reduced ore to be discharged into water to produce steam and cool the ore, which steam tends to pass upwardly through the downwardly traveling column, by utilizing the steam for vaporizing the reducing agent which is passed upwardly in the reducing zone and by maintaining a steam pressure slightly above the entry pressure of the reducing agent into the reducing zone to prevent downward escape of the fuel into the cooling zone and to prevent upward escape of steam into the reducing zone.

3. A process for converting hematite into magnetite which comprises moving a vertical column of relatively coarse ore downwardly through a current of heating gases, thereafter introducing relatively fine ore into the heated coarse ore while continuing the downward movement into a reducing zone, intimately commingling said fine and coarse ores in the presence of reducing agent while continuing said downward movement through said reducing zone and thereafter passing said ores through a reoxidizing zone containing steam.

4. A process for converting hematite into magnetite which comprises moving a vertical column of relatively coarse ore downwardly through a current of heating gases, thereafter introducing relatively fine ore into the heated coarse ore while continuing the downward movement into a reducing zone, intimately commingling said fine and coarse ores in the presence of reducing agent while continuing said downward movement through said reducing zone, and extracting heat from said commingled mass.

5. A process for converting hematite into magnetite which comprises moving a vertical column of relatively coarse ore downwardly through a current of heating gases, thereafter introducing relatively fine ore into the heated coarse ore while continuing the downward movement into a ducing zone, intimately commingling said fine and coarse ores in the presence of reducing agent while continuing said downward movement through said reducing zone, and quenching said commingled ore in water while continuing said downward movement.

6. A process for converting hematite into magnetite which comprises moving a column of relatively coarse ore downwardly through a heating zone, introducing relatively fine ore while continuing the downward movement into a reducing zone, and intimately commingling said fine and coarse ores in the presence of reducing agent while continuing said downward movement through said reducing zone, the movement of said column being regulated so that each particle of ore remains in a zone for substantially the same length of time as other particles passing through such zone.

7. The method of extracting hot magnetite from a vessel in which said magnetite is produced by subjecting heated hematite to reducing vapors at more than atmospheric pressure, and of preventing the loss of such reducing vapors during removal of said magnetite which comprises permitting said hot magnetite to fall into the water of a water-sealed chamber connected with said vessel, collecting the steam generated by the falling of said hot magnetite into said water, maintaining said steam at a pressure sufficient to preclude the down flow of reducing vapors into said chamber with said magnetite, and removing the wetted and cooled magnetite through said water seal.

8. The steps in the process of converting hematite into magnetite which comprises moving a column of relatively coarse hematite ore downwardly, laterally introducing hot gases into said column of relatively coarse hematite ore while said ore is moving downwardly, permitting said hot gases to permeate the relatively coarse ore and travel upwardly therethrough, laterally removing said gases at a point in said column above said point of entry, admixing a proportion of relatively fine relatively cold hematite ore with the relatively coarse hot ore of said column below said lateral point of entry of said heated gases, and progressing said ores downwardly through a reducing zone.

9. A continuous process of treating hematite which comprises preheating hematite ore, treating said heated hematite to the action of a heat volatilized normally liquid reducing agent, quenching the thus treated ore in water to prevent reoxidation, collecting the steam vapor thus formed and vaporizing additional normally liquid reducing agent for use in said continuous process.

10. A continuous process for converting hematite into magnetite, in which hematite is passed successively through connected zones of a treating furnace which comprises passing said hematite through a heating zone, thereafter passing said heated hematite through a reducing zone in which a gaseous reducing agent is maintained at more than atmospheric pressure, and thereafter passing said reduced ore through a reoxidizing zone in the presence of water vapor, the pressure of said water vapor being maintained slightly in excess of the gaseous reducing agent in said reducing zone.

11. A process for converting hematite into magnetite which comprises moving a vertical column of relatively coarse ore downwardly through a current of heating gases, thereafter introducing relatively fine ore into the heated coarse ore while continuing the downward movement into a reducing zone, and intimately commingling said fine and coarse ores in the presence of reducing agent while continuing said downward movement through said reducing zone.

EDWARD W. DAVIS.